(12) United States Patent
Thomson

(10) Patent No.: US 7,469,194 B2
(45) Date of Patent: Dec. 23, 2008

(54) METHOD FOR OPTIMIZING THE DISTRIBUTION OF SENSOR RESOURCES

(75) Inventor: Ola Thomson, Askim (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 93 days.

(21) Appl. No.: 11/587,428

(22) PCT Filed: May 28, 2004

(86) PCT No.: PCT/SE2004/000820

§ 371 (c)(1),
(2), (4) Date: Oct. 25, 2006

(87) PCT Pub. No.: WO2005/116687

PCT Pub. Date: Dec. 8, 2005

(65) Prior Publication Data

US 2008/0011112 A1    Jan. 17, 2008

(51) Int. Cl.
*G01D 18/00* (2006.01)
*G06F 19/00* (2006.01)
(52) U.S. Cl. ..................................... 702/104
(58) Field of Classification Search ............... 702/81, 702/104, 128, 176, 188; 73/866.5
See application file for complete search history.

(56) References Cited

U.S. PATENT DOCUMENTS 4,724,428 A     2/1988  Arnold et al.
6,260,759 B1 *  7/2001  Nguyen et al. .............. 235/411

FOREIGN PATENT DOCUMENTS

WO          92/17796       10/1992

OTHER PUBLICATIONS

International Search Report of PCT/SE2004/000820, mailed Dec. 22, 2004.

* cited by examiner

*Primary Examiner*—Bryan Bui
(74) *Attorney, Agent, or Firm*—Nixon & Vanderhye P.C.

(57) ABSTRACT

The invention discloses a method for optimizing the distribution of the resources of a scanning sensor over a number of areas, where each area can have demands for sensor resources. Said demands are expressed as a dwell time and a revisit time, and the method comprises assigning to each of said number of areas a priority, and compiling the total demands for resources. The total demand is compared with the total sensor resources, and if the total demand and total resources do not match, the total resources are distributing according to said priority. Preferably, the demand for sensor resources in an area is calculated as the ratio between dwell time and revisit frequency.

10 Claims, 1 Drawing Sheet

METHOD FOR OPTIMIZING THE DISTRIBUTION OF SENSOR RESOURCES

TECHNICAL FIELD

The technical field relates to discloses a method for optimizing the distribution of the resources of a scanning sensor over a number of areas where each area can have demands for sensor resources, the demands being expressed as a dwell time and a revisit time.

STATE OF THE ART

Current sensor technology makes it possible to control a sensor in ways which have not been possible previously. For example, the direction in which a sensor scans can be controlled in other ways than purely mechanical ways.

Such sensor technology leads to an increased need for methods which can be used for optimizing the distribution of the resources of a sensor.

SUMMARY OF THE INVENTION

The need stated above is addressed by a method for optimizing the distribution of the resources of a scanning sensor over a number of areas, where each area can have different demands for sensor resources.

Said demands are expressed as a dwell time and a revisit time, and the method comprises:
  assigning to each of said number of areas a priority,
  compiling the total demands for resources,
  comparing the total demand with the total sensor resources.

If the total demand and total resources don't match, the total resources are distributed according to said priority for the areas, wherein the demand for sensor resources in an area is calculated as a ratio between dwell time and revisit time.

BRIEF DESCRIPTION OF THE DRAWINGS

One or more aspects will be described in more detail in the following, with reference to the enclosed FIG. 1, which shows a sensor and a sensor platform and a number of areas over which the sensor resources are to be distributed.

EMBODIMENTS

Figure 1:
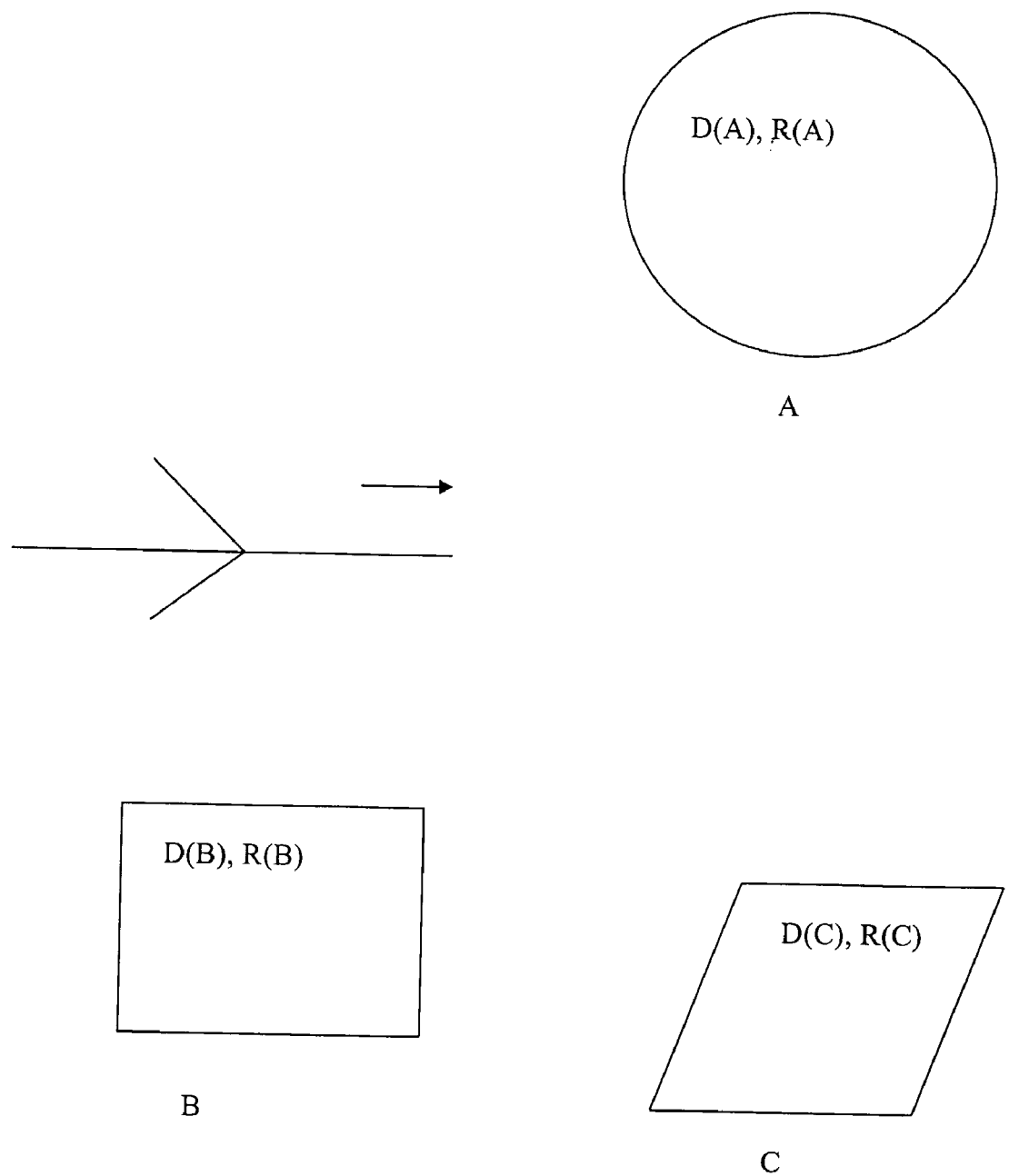

FIG. 1 schematically serves to illustrate a problem to be solved: A sensor, symbolically assumed to be arranged in or on an aircraft moves through an area in a direction of movement D. It is assumed that the sensor is a scanning sensor, suitably a sensor with electrically controllable beam(s) so that the direction and periodicity of the sensor beams(s) can be controlled in a variety of ways.

In the example shown in FIG. 1 there are three areas A, B, C, which need to be covered by the sensor. For each area, the demand for sensor resources can be expressed as a combination of two parameters, dwell time and revisit time.

These parameters are suitably entered by an operator of the sensor, which from now on will be assumed to be a radar, although the aspects of the invention can be applied to virtually any kind of sensor which can be directed in a plurality of directions. The aspects can also be applied to passive as well as active sensors, and the sensor platform can be chosen more or less arbitrarily, and can be stationary as well as mobile.

The dwell time for an area is defined as the time that the sensor scans that area, i.e. the time that the antenna beam covers any part of the area. It is to be noted that this definition also covers the ease of a passive sensor. Dwell time can be suitably expressed in seconds. An increase in dwell time for an area will lead to a higher sensitivity or detection range for the sensor in that area.

The revisit time for an area can also be defined in seconds, measured as the mean time between two scans of an area. Another way of expressing revisit time is as the inverse value of the frequency with which the sensor scans that particular area, i.e. from the time that the antenna beam ceases to cover any part of the area until the antenna beam covers a part of the area again. An increased revisit frequency for an area will lead to a good ability to detect changes in that area.

With renewed reference to FIG.1, for the purpose of distributing or allocating sensor resources, the sensor demand will be determined for each area. In an aspect, the demand is determined as a function of the desired dwell time and revisit time for the area. In more detail the demand is determined by calculating the ratio between the dwell time and the revisit time.

Thus, the demand for sensor resources of area n, R(n) can be expressed as:

$$R(n) = \text{dwell}(n)/\text{revisit}(n) \quad [1]$$

The total demands of all of the areas can be compiled and expressed as a sum. Thus, the total of the demands for areas 1-N will be:

$$\sum_{1}^{N} \text{dwell}(n)/\text{revisit}(n) \quad [2]$$

The total demand calculated according to (2) above can then be compared to the sensor resources available. If the total demand matches the available resources, each area will be assigned the dwell time and revisit time which are desired.

However, if the total demand exceeds the available resources, a method for redistributing the available resources is provided. The method can in fact also be used if the total demand falls below the available sensor resources. Both of these alternatives will be demonstrated below. In both cases, a priority assigned to the areas will be used. Suitably, this priority is entered by an operator of the sensor. The priority is expressed as a number greater than zero, suitably but not necessarily an integer.

Needless to say, if the total demand is less than the total available resources, the respective areas can also be given the resources they've demanded. This is preferably decided by an operator of the sensor.

EXAMPLE 1

Demand<Resources, all Priorities Equal

In this example, in order to facilitate the understanding of the invention, it is assumed that all of the areas A, B, C, have equal priorities, P=1.

In addition, the respective ratios or demands calculated according to [1] are as follows:

R(A)=50%
R(B)=20%
R(C)=10%

Thus, the total demand for the sensor resources will be 80%, and there is a "surplus" of sensor resources, ΔR, of 20%.

This surplus is, according to the invention, distributed over the different areas by using the following equation:

$$\Delta R_n = (P_n * R_n / \Sigma(P_n * R_n)) * \Delta R_{tot} \quad [3]$$

Where: $\Delta R_n$ is the amount of additional sensor resources that will be allocated to area n, and $P_n$ is the priority for area n, $R_n$ is the desired amount of resources for area n, $\Sigma P_n * R_n$ is taken overall areas n, $\Delta R_{tot}$ is the total surplus of sensor resources.

In the present example, the priority for all of the areas is 1, leading to the following resulting calculations:

$$\Delta R_A = (0.50/0.80) * 0.2 = 12.5\%$$

$$\Delta R_B = (0.20/0.80) * 0.2 = 5\%$$

$$\Delta R_C = (0.10/0.80) * 0.2 = 2.5\%$$

Expressed in a slightly different manner, area A is allocated 12.5/20=62.5% of the surplus resources, and in a similar fashion areas B and C respectively, receive 25% and 12.5% of the surplus resources.

EXAMPLE 2

Demand>Resources, All Priorities Equal

In the following example, it is again assumed that all of the areas A, B, C, have equal priorities, P=1.

In addition, in this example the respective ratios or demands calculated according to [1] are as follows:

R(A)=75%

R(B)=30%

R(C)=15%

Thus, the total demand is 120%, meaning that there is a "deficit" of resources of 20%. In such cases, the allocated resources for the areas are decreased compared to the demands using the following equation:

$$R_n = ((P_{tot} - P_n) * R_n / \Sigma((P_{tot} - P_n) * R_n)) * \Delta R_{tot} \quad [4]$$

where $P_{tot}$ is the sum of the priorities of all of the areas in question.

In the present case, all of the areas have a priority of 1, leading to $P_{tot}=3$ and $P_{tot}-P_n=2$.

In the present example, as stated previously, the resource deficit is 20%, and the resources allocated to each area will be decreased with respect to the demand in the following manner:

$$\Delta R_A = (2*0.75/2*1.2) * 0.2 = 12.5\%$$

$$\Delta R_B = (2*0.3/2*1.2) * 0.2 = 5\%$$

$$\Delta R_C = (2*0.15/2*1.2) * 0.2 = 2.5\%$$

Consequently, the allocated resources per area will be:

$$R_A = 0.75 - 12.5 = 62.5\%$$

$$R_B = 0.30 - 5 = 25\%$$

$$R_C = 15 - 2.5 = 12.5\%$$

EXAMPLE 3

Demand<Resources, Different Priorities

In the following example, in order to further illustrate an aspect, it will be assumed that the areas have differing priorities, as follows:

P(A)=2

P(B)=1

P(C)=0

Thus, $P_{tot}=3$

Furthermore, the demands of the various areas, calculated according to [1] will in this example be assumed to be:

R(A)=50%

R(B)=20%

R(C)=10%

Accordingly, there is a "resource surplus" of 20% to distribute, which will be done according to equation [3] above:

$$\Delta R_A = (2*0.50/(2*0.50+0.20)) * 0.2 = 16.67\%$$

$$\Delta R_B = (1*0.20/(2*0.50+0.20)) * 0.2 = 3.33\%$$

$$\Delta R_C = 0\%$$

Expressed in a slightly different manner, area A is allocated 16.67/20=83.35% of the surplus resources, and in a similar fashion area B receives 3.33/20=16.67% and area C 0% of the surplus resources.

EXAMPLE 4

Demand>Resources, Different Priorities

In this example, as in example 3 above, the priorities for the different areas differ from each other:

P(A)=2

P(B)=1

P(C)=0

Thus, $P_{tot}=3$.

The demands from the areas, calculated according to [1] are:

R(A)=75%

R(B)=30%

R(C)=15%

Accordingly, the total demands for resources are 120%, and the resources allotted to each of the areas need to be decreased compared to the demands. This will be done according to [4] above:

$$\Delta R_A = (0.75/(0.75+2*0.30+3*0.15)) * 0.2 = 8.33\%$$

$$\Delta R_B = (2*0.30/(0.75+2*0.30+3*0.15)) * 0.2 = 6.67\%$$

$$\Delta R_C = (3*0.15/(0.75+2*0.30+3*0.15)) * 0.2 = 5\%$$

Consequently, the allocated resources per area according to [4] will be:

$$R_A = 75\% - 8.33\% = 66.67\%$$

$$R_B = 30\% - 6.67\% = 23.33\%$$

$$R_C = 15\% - 5\% = 10\%$$

The invention is not limited to the examples of embodiments which have been shown above, but can be freely varied within the scope of the appended claims.

For example, the priority which is assigned to each area could be made dependent on the ratio between available resources and the total demands for resources. In such a case, an area's priority could be different in a case where there is a resource surplus as compared to a case with a surplus deficit.

It is also envisioned that the priority for dwell time and revisit time could be different from each other for one and the same area.

The invention claimed is:

1. A method for optimizing a distribution of resources of a scanning sensor over a number of areas, where each area can have a demand for the sensor resources, said demands being expressed as a dwell time and a revisit time, the method comprising:
   assigning to each of said number of areas a priority;
   compiling a total demand for the resources;
   comparing the total demand with total sensor resources; and
   when the total demand and the total sensor resources do not match, distributing the total sensor resources according to said priority.

2. The method of claim 1, wherein the demand for sensor resources in an area is calculated as a ratio between dwell time and revisit time.

3. The method of claim 1, wherein when the total sensor resources exceed the total demand, surplus resources are distributed according to an equation:

$$\Delta R_n = (P_n * R_n / \Sigma(P_n * R_n)) * \Delta R_{tot}$$

where:
$\Delta R_n$ is an amount of additional sensor resources that will be allocated to an area n,
$P_n$ is the priority for the area n,
$R_n$ is the desired amount of resources for the area n,
$\Sigma P_n * R_n$ is taken over all areas n, and
$\Delta R_{tot}$ is the total surplus of sensor resources.

4. The method of claim 1, wherein when the total demand exceed the total sensor resources, allocated sensor resources for the areas are decreased by an amount $\Delta R$ compared to the demands according to an equation:

$$\Delta R_n = ((P_{tot} - P_n) * R_n / \Sigma((P_{tot} - P_n) * R_n)) * \Delta R_{tot}$$

where:
$\Delta R_n$ is a decrease in allocated resources for an area n,
$P_{tot}$ is a sum of the priorities of all of the areas,
$P_n$ is the priority for area n,
$R_n$ is the desired amount of resources for area n,
$\Sigma P_n * R_n$ is taken over all areas n, and
$\Delta R_{tot}$ is a total reduction of sensor resources demanded.

5. The method of claim 1, wherein when the total sensor resources exceed the total demand, only surplus resources are distributed according to the priorities of the areas.

6. The method of claim 1, wherein when the total demand exceed the total sensor resources, allocated sensor resources for each area are decreased based on a proportion of the demand associated with the area and only a total of the decreased sensor resources are distributed according to the priorities of the areas.

7. A method for optimizing the distribution of a scanning sensor resource over plural areas, the method comprising:
   determining sensor priority associated with each of the plural areas;
   determining a total demand for the scanning sensor resource based on individual demands of the plural areas, wherein each area demands a portion of the scanning sensor resource;
   comparing the total resource demand with a total resource available; and
   determining whether the total resource available is greater than the total resource demand based on the comparison;
   wherein when it is determined that there is total resource available is greater than the total resource demand, the method further comprising:
      providing to each area the portion of the scanning sensor resource demanded by the area; and
      distributing a surplus resource available based on the corresponding sensor priority of each area.

8. The method of claim 7, wherein in the step of distributing the surplus resource available, the distribution is performed according to an equation:

$$\Delta R_n = (P_n * R_n / \Sigma(P_n * R_n)) * \Delta R_{tot}$$

where:
$\Delta R_n$ is an amount of additional sensor resources allocated to an area n,
$P_n$ is the sensor priority for the area n,
$R_n$ is the portion of scanning sensor resource originally demanded by the area n,
$\Sigma P_n * R_n$ is taken over all areas n, and
$\Delta R_{tot}$ is the surplus resource available.

9. A method for optimizing the distribution of a scanning sensor resource over plural areas, the method comprising:
   determining sensor priority associated with each of the plural areas;
   determining a total demand for the scanning sensor resource based on individual demands of the plural areas, wherein each area demands a portion of the scanning sensor resource;
   comparing the total resource demand with a total resource available; and
   determining whether the total resource available is less than the total resource demand based on the comparison;
   wherein when it is determined that there is total resource available is less than the total resource demand, the method further comprising:
      decreasing, for each area, an amount of the scanning sensor resource provided to the area such that a total amount of reduction provided to the plural areas aligns the total resource available to the total resource provided to the plural area;
      distributing a total amount of reduction based on the corresponding sensor priority of each area.

10. The method of claim 9, wherein in the step of distributing the total amount of reduction, the distribution is performed according to an equation:

$$\Delta R_n = ((P_{tot} - P_n) * R_n / \Sigma((P_{tot} - P_n) * R_n)) * \Delta R_{tot}$$

where
$\Delta R$ is an amount of reduction in the resource for an area n,
$P_{tot}$ is a sum of the priorities of all of the areas,
$P_n$ is the sensor priority for area n,
$R_n$ is the portion of scanning sensor resource originally demanded by the area n,
$\Sigma P_n * R_n$ is taken over all areas n, and
$\Delta R_{tot}$ is a total amount of reduction of demand.

* * * * *

UNITED STATES PATENT AND TRADEMARK OFFICE
CERTIFICATE OF CORRECTION

PATENT NO. : 7,469,194 B2
APPLICATION NO. : 11/587428
DATED : December 23, 2008
INVENTOR(S) : Thomson Page 1 of 1

It is certified that error appears in the above-identified patent and that said Letters Patent is hereby corrected as shown below:

In Column 1, Line 3, above the heading "TECHNICAL FIELD" insert -- This application is the US national phase of international application PCT/SE2004/000820, filed 28 May 2004, which designated the U.S., the entire content of which is hereby incorporated by reference. --.

In Column 2, Line 1, delete "ease" and insert -- case --, therefor.

In Column 3, Lines 38-39, in Equation [4], delete "$R_n=$" and insert -- $\Delta R_n=$ --, therefor.

In Column 6, Line 51, in Claim 10, delete "$\Delta R$" and insert -- $\Delta R_n$ --, therefor.

Signed and Sealed this

Twentieth Day of October, 2009

David J. Kappos
*Director of the United States Patent and Trademark Office*